United States Patent
Tai et al.

(10) Patent No.: US 8,464,521 B2
(45) Date of Patent: Jun. 18, 2013

(54) METHOD AND ARRANGEMENT FOR MAINTAINING A DIESEL PARTICULATE FILTER IN A DIESEL ENGINE EXHAUST SYSTEM

(75) Inventors: Chun Tai, Hagerstown, MD (US); Kenth I. Svensson, Hagerstown, MD (US)

(73) Assignee: Mack Trucks, Inc., Greensboro, NC (US)

(*) Notice: Subject to any disclaimer, the term of this patent is extended or adjusted under 35 U.S.C. 154(b) by 633 days.

(21) Appl. No.: 12/597,886

(22) PCT Filed: May 1, 2007

(86) PCT No.: PCT/US2007/067888
§ 371 (c)(1),
(2), (4) Date: Oct. 27, 2009

(87) PCT Pub. No.: WO2008/133694
PCT Pub. Date: Nov. 6, 2008

(65) Prior Publication Data
US 2010/0089041 A1 Apr. 15, 2010

(51) Int. Cl.
*F01N 3/00* (2006.01)
*F01N 3/02* (2006.01)

(52) U.S. Cl.
USPC .................... 60/295; 60/274; 60/311

(58) Field of Classification Search
USPC .................... 60/274, 286, 295, 297, 303, 311
See application file for complete search history.

(56) References Cited

U.S. PATENT DOCUMENTS

| | | | |
|---|---|---|---|
| 6,405,528 B1 | 6/2002 | Christen et al. | |
| 6,862,927 B2 | 3/2005 | Craig et al. | |
| 6,941,750 B2 | 9/2005 | Boretto et al. | |
| 7,065,960 B2 | 6/2006 | Gioannini et al. | |
| 2005/0235633 A1 | 10/2005 | Bartsch et al. | |
| 2005/0268597 A1* | 12/2005 | Kosaka | 60/277 |
| 2006/0107649 A1 | 5/2006 | Kamikawa et al. | |
| 2006/0137340 A1 | 6/2006 | Stewart | |
| 2006/0191258 A1 | 8/2006 | Opris | |
| 2007/0056272 A1 | 3/2007 | Dollmeyer et al. | |

FOREIGN PATENT DOCUMENTS

EP 1582714 A1 * 10/2005

OTHER PUBLICATIONS

International Search Report for corresponding International Application PCT/US2007/067888.
Written Opinion of the International Searching Authority for corresponding International Application PCT/US2007/067888.
International Preliminary Report on Patentability for corresponding International Application PCT/US207/067888.

* cited by examiner

*Primary Examiner* — Kenneth Bomberg
*Assistant Examiner* — Audrey K Bradley
(74) *Attorney, Agent, or Firm* — WRB-IP LLP

(57) ABSTRACT

A method and apparatus for maintaining a diesel particulate filter (DPF) is provided. A pressure drop across the DPF is measured and an initial estimate of soot loading in the DPF is provided to a recursive filter. Using the recursive filter, the initial estimate of soot loading is updated in view of the measured pressure drop to provide an updated estimate of soot loading in the DPF. Active regeneration of the DPF is triggered when an earliest one of at least one triggering condition occurs, the updated estimate of soot loading reaching a predetermined value being one of the at least one triggering condition.

10 Claims, 1 Drawing Sheet

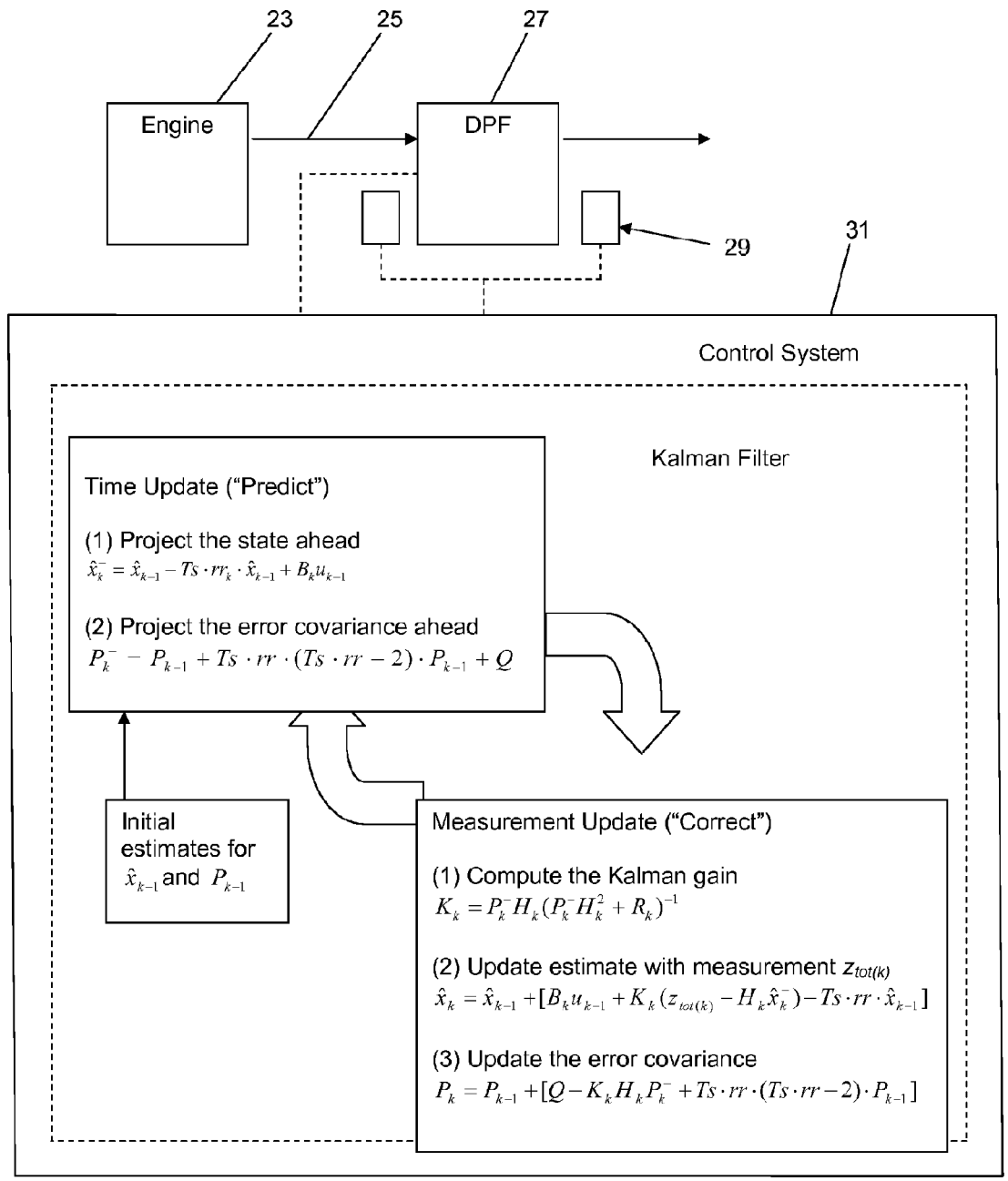

METHOD AND ARRANGEMENT FOR MAINTAINING A DIESEL PARTICULATE FILTER IN A DIESEL ENGINE EXHAUST SYSTEM

BACKGROUND AND SUMMARY

The present invention relates generally to diesel engines with exhaust systems comprising diesel particulate filters (DPF) and, more particularly, to methods and arrangements for triggering and stopping active regeneration in DPFs.

In diesel engines, it is now typical to use a DPF downstream of the engine to filter particulate from the engine exhaust. If too much soot collects in the DPF, the soot can burn in an uncontrolled manner and may crack or melt the DPF. This phenomenon is sometimes referred to as a "runaway" or uncontrolled regeneration. Other problems can result from excessive soot accumulation in the DPF as well, such as an increase in engine backpressure, which can have an adverse effect on engine operation and affect fuel consumption.

To avoid aforementioned problems such as runaway regenerations, it is common to periodically clean the DPF by burning off the soot, through a so-called active regeneration by $O_2$ oxidation, in a controlled manner that does not damage the DPF. Ordinarily, exhaust systems are configured to perform an active regeneration when soot loading in the DPF filter reaches a level of about 5 g/l (grams per liter). This active regeneration cycle could be triggered by a sensor that measures a particular pressure drop across the DPF that, given a particular soot model for the filter, corresponds to a particular soot loading level. Other events may trigger active regenerations, as well, such as operation for a predetermined length of time.

In the present application, references to "models" of aspects of engine operation are understood to generally refer to simulation software that calculates those operation aspects in real-time or offline based on known engine parameters and/or sensor measurements. The development of such models is well-known in the field of diesel engines; many models relate only to the particular engine for which they were developed, and the development of such models is not intended to form part of the present invention, except as otherwise described herein. Variables or parameters associated with such engine operation models are ordinarily determined through extensive testing of engine operation and the process by which they are determined is also known in the field of diesel engines.

While, in the ideal case, soot should collect uniformly in the DPF, in practice, it does not always do so. Two main causes for non-uniform soot distribution are high flow velocity through the DPF, such as often occurs during highway driving, and so-called passive regeneration, which occurs when $NO_2$ in the exhaust gas oxidizes the soot. Passive regeneration typically occurs at temperatures of about 250° C. to 450° C., which falls at least partially within normal operating temperatures of the DPF. Active regeneration typically occurs at temperatures greater than 550° C.

Triggering of the active regeneration cycle as a function of pressure drop across the DPF assumes a uniform soot distribution. When soot is not uniformly distributed then it is possible that, although the pressure drop across the DPF has not reached a trigger point, some portions of the DPF may have soot loading at or above the level where runaway regeneration can occur, and other portions of the DPF may have soot loading below that level. In other words, in certain conditions, the pressure drop measurements may tend to underestimate actual soot loading on parts of the DPF, which can lead to damage to the DPF.

Once an active regeneration begins, regeneration proceeds according to a regeneration schedule for the filter for a predetermined length of time such that it will be completely or substantially burnt off.

It is desirable to provide a system and method for triggering active regenerations in a DPF where soot loading may be non-uniform. It is also desirable to provide a system and method for triggering the end of active regeneration in a DPF where soot loading may be non-uniform.

In accordance with an aspect of the present invention, a method for maintaining a DPF is provided. According to the method, a pressure drop across the DPF is measured. An initial estimate of soot loading in the DPF is provided to a recursive filter in the preferred embodiment. In another embodiment of the invention, a cost function or a weight function could be used instead. Using the recursive filter, the initial estimate of soot loading is updated in view of the measured pressure drop to provide an updated estimate of soot loading in the DPF. Active regeneration of the DPF is triggered when the earliest one of at least one triggering condition occurs, the updated estimate of soot loading reaching a predetermined value being one of the at least one triggering condition.

In accordance with another aspect of the present invention, a method for estimating soot loading in a DPF is provided. According to the method, a pressure drop across the DPF is measured. An initial estimate of soot loading in the DPF is provided to a recursive filter. Using the recursive filter, the initial estimate of soot loading is updated in view of the measured pressure drop to provide an updated estimate of soot loading in the DPF.

In accordance with another aspect of the present invention, a diesel engine system comprises a diesel engine, a DPF downstream of the engine, a pressure sensor arrangement for measuring pressure drop across the DPF, and a control system. The control system comprises a recursive filter arranged so that, upon provision of a soot loading estimate in the DPF and a measurement by the pressure sensor arrangement of pressure drop across the DPF, an updated soot loading estimate in the DPF is provided, and so that active regeneration of the DPF is triggered in response to at least one triggering condition, the at least one triggering condition including the updated estimate of soot loading.

BRIEF DESCRIPTION OF THE DRAWING

The features and advantages of the present invention are well understood by reading the following detailed description in conjunction with the drawing in which like numerals indicate similar elements and in which:

FIG. 1 schematically shows an engine exhaust system including a DPF according to an embodiment of the present invention.

DETAILED DESCRIPTION

A diesel engine system 21 according to an embodiment of the present invention shown in FIG. 1 and comprises a diesel engine 23 and an exhaust line 25 including a DPF 27 downstream of the engine cylinders. A sensor arrangement 29 that ordinarily includes differential pressure (delta-P) sensor measures pressure at an inlet and an outlet of the DPF 27. A heating element or device (not shown) is disposed in or upstream of the DPF 27 to raise the temperature of the exhaust gas flow during active regeneration. The sensor arrangement 29 also typically comprises monitors for monitoring temperature of the exhaust gas flow, typically at least in the DPF, often upstream and downstream of the DPF, as well.

A controller 31 is provided. The controller 31 receives signals from the delta-P sensor and the temperature monitors, processes the signals, and, in response to the signals, determines whether active regeneration should be triggered or, if triggered, whether it should be stopped. If the controller 31 determines that active regeneration should be triggered, it sends a signal to the heating element to heat the exhaust gas flow. If the controller 31 determines that active regeneration should be stopped, it sends a signal to the heating element to stop heating of the exhaust gas flow.

The controller 31 can trigger and stop active regeneration as a function of an estimated soot loading in the DPF 25. The soot load estimate can be obtained through a recursive filtering procedure performed by the controller 31 using inputs from the delta-P sensor and the temperature monitors. It is presently preferred to obtain the estimate using a discrete Kalman filter.

Soot loading in a DPF can be estimated according to an aspect of the present invention using a recursive filtering approach, preferably such as a Kalman filter. Starting and stopping of active regeneration of the DPF can be affected as a function of the soot loading estimate. The following describes the process for estimating accumulated soot mass and non-uniform soot distribution using a recursive Kalman filter.

Estimate/Model Prediction of Soot Loading—x

Using a Kalman equation analysis, an estimate of soot loading in a DPF resulting from a soot loading process of the DPF is governed by the linear stochastic difference equation:

$$x_k = A_k x_{k-1} + B_k u_{k-1} + w_{k-1} \quad (1)$$

where:

$x_k$ is estimated soot loading at time k;

A is an n×n matrix that relates the state of soot loading $x_{k-1}$ at the previous time step k−1 to the state $x_k$ at the current time step k in the absence of either a driving function or process noise, and is determined by a DPF regeneration model;

u is a control input value for the engine soot generation rate that is determined by an engine soot generation model;

B is an n×1 matrix determined by filter effectiveness that relates the value u at the previous time step k−1 to the state of soot loading $x_k$ at time k; and w is uncertainty (noise) of the process model.

Measurement—z

A measurement, in particular, the pressure drop across the DPF is represented by the equation:

$$z_k = H_k x_k + v_k \quad (2)$$

$z_k$ is a measurement of pressure drop (hereinafter delta-P) across the DPF from the delta-P sensor at time step k;

H is an m×n matrix that relates the state of soot loading, i.e., x, to the measurement $z_k$ of delta-P across the DPF; and v is uncertainty (noise) of the measurement.

Random variables for process noise or uncertainty w and measurement noise or uncertainty v are assumed to be independent of each other and, with normal probability distribution:

$$p(w) \sim N(0, Q) \quad (3)$$

$$p(v) \sim N(0, R) \quad (4)$$

Where:

Q is the process noise covariance; and

R is the measurement noise covariance.

Values for Q and R are calibrated in test cells. Q is calibrated by measuring the prediction error of the internal model $x_k = A_k x_{k-1} + B_k u_{k-1} + w_{k-1}$ and R is calibrated by measuring the prediction error of the sensor-based model $z_k = H_k x_k + v_k$. The uncertainties of the model prediction and measurement are independent, and are described as a normal distribution with zero mean.

Soot Generation Rate—u

The engine soot generation rate, u, can be estimated by the engine soot generation model. A transient-cycle indicator $I_t$ can be introduced to adjust the soot prediction for an improved estimate and is defined as:

$$I_t = C_1 + \frac{C_2}{T_s} \cdot \left( \frac{AFR_{k-1}}{AFR_k} - 1 \right) \quad (5)$$

Where:

AFR is the air/fuel ratio;

$T_s$ is a sampling time interval;

$C_1$ is a parameter equal to "1" when the engine soot generation model is properly calibrated; and $C_2$ is a calibration parameter for the particular soot generation model.

The transient-cycle indicator $I_t$ is always greater than or equal to $C_1$, i.e., when $AFR_{k-1} < AFR_k$. the algorithm automatically sets $I_t$ equal to $C_1$.

Soot Regeneration Factor—A

The DPF is regenerated by burning off soot, as the result of a reaction with $NO_2$ at lower exhaust temperatures during normal operation and with $O_2$ during a regeneration process. $NO_2$ and $O_2$ react with soot in the DPF in the following temperature ranges: approx. 250-450° C. and >550° C. respectively. The soot regeneration model is defined as:

$$A_k = 1 - T_s \cdot rr_k \quad (6)$$

Where:

Ts is the sampling time of the control system rr is the soot reaction rate, which can be estimated as:

$$rr_k = C_3 \cdot [O_2]_k \cdot \exp[-E_{o2}/(R_g T_k)] + C_4 \cdot [NO_2]_k \cdot \exp[-E_{no2}/R_g T_k] \quad (7)$$

$$[O_2]_k = \frac{(AFR_k - AFRs) \times 0.21}{AFR_k + 0.065 \times AFRs} \quad (8)$$

Where:

$[O_2]$ is oxygen concentration in the exhaust stream;

$[NO_2]$ is $NO_2$ concentration in the exhaust stream;

$R_g$ is the gas constant;

$AFR_k$ is the air/fuel ratio at time k;

AFRs is the stoichiometric air/fuel ratio for diesel;

$C_3$, $C_4$, $E_o$, and $E_{no}$ are calibration parameters determined through testing.

Non-Uniform Soot Distribution Adjustment $x_{Nud}$ for Soot Loading Estimate x Based on Delta-P Sensor Measurement z If the soot loading distribution is uniform across the DPF, the following equation describes a soot loading estimator based on the delta-P measurement:

$$x_{p(k)} = z_k / H_k \quad (9)$$

Where $x_{p(k)}$ is the delta-P sensor predicted soot loading where uniform distribution is assumed;

$z_k$ is the delta-P sensor measurement; and $H_k$ is the gain of the delta-P sensor based soot loading estimator, which is calculated based on the volume flow of the exhaust gas and the temperature of the exhaust gas.

Soot distribution in an actual DPF will often be non-uniform, however, in which case the soot-loading predicted by the delta-P sensor based soot model will likely be lower than the actual soot loading inside the DPF, at least in local areas. Accordingly, a Non-Uniform Distribution model, $x_{nud(k)}$, is introduced to estimate the difference. If:

$x_{tot(k-1)} \geq x_{nud(k-1)}$ (where $x_{tot}$=estimated total soot loading)
and $v_{k-1} > v_0$ then the non-uniform distribution model can be represented as:

$$x_{nud(k)} = x_{nud(k-1)} + [k_1 \cdot rr_{(k-1)} + k_2 \cdot (v_{(k-1)} - v_0)^2] \cdot [x_{tot(k-1)} - x_{nud(k-1)}] \quad (10)$$

Where:
$x_{nud(k)}$ is the non-uniformly distributed soot mass estimate at time k;
$x_{nud(k-1)}$ is the non-uniformly distributed soot mass estimate at time k−1;
$vel_{(k-1)}$ is the exhaust gas flow velocity at time k−1;
$v_o$ is the minimum exhaust gas flow velocity that can cause non-uniform soot distribution;
$k_1$, $k_2$ are calibration parameters; and
$rr_{(k-1)}$ is the soot reaction rate at time k−1.

The model in equation (10) is based on the expectation that soot is non-uniformly distributed because of soot regeneration and high exhaust gas velocity. In equation (10), if rr>0, then it generates some $x_{nud}$; or if the velocity of the exhaust gas exceeds a threshold value then it generates some $x_{nud}$. The more $x_{nud}$ that currently exists, the less likely that more $x_{nud}$ will be generated. Once $x_{nud} = x_{tot}$ then no more $x_{nud}$ can be generated.

If:
$x_{tot(k-1)} \geq x_{nud(k-1)}$
and
$v_{k-1} \leq v_0$ then the non-uniform distribution model can be represented as:

$$x_{nud(k)} = x_{nud(k-1)} + k_1 \cdot rr_{(k-1)} \cdot [x_{tot(k-1)} - x_{nud(k-1)}] \quad (11)$$

when $v_{k-1} = v_o$, i.e. $v_{k-1} - v_o = 0$ so part of equation (10) cancels out.

If $x_{tot(k-1)} < x_{nud(k-1)}$:

$$x_{nud(k)} = x_{nud(k-1)} - rr_{(k-1)} \cdot x_{tot(k-1)} \quad (12)$$

when $v_{k-1} < v_0$, at which time it is understood that all soot is $x_{nud}$ soot, and the total soot loading is decreasing. Therefore, $x_{nud}$ should decrease and the rate for it to decrease is $rr \cdot x_{tot}$.

Using the foregoing adjustments for non-uniform soot distribution, the delta-P sensor-based soot loading model looks like:

$$z_{tot(k)} = H_k(x_{p(k)} + x_{nud(k)}) \quad (13)$$

where $z_{tot(k)}$ is the calculated pressure drop assuming that $x_{p(k)} + x_{nud(k)}$ are correct.

The variance of the model estimate, i.e., measurement noise covariance, is adjusted according to the following equation:

$$R_k = R0 \cdot \exp(k_3 \cdot x_{nud(k)}) \quad (14)$$

Where:
R0 is the variance of the model estimate when soot is uniformly distributed; and
$k_3$ is a calibration parameter.

Formulating a discrete-time Kalman Filter using a priori soot loading estimates and delta-P sensor measurements it is possible to arrive at an a posteriori estimate of the soot load in the DPF. The discrete-time Kalman filter time update or prediction equations are represented by the a priori state estimate at time k (in the following equations, it will be understood that $x_k = x_{p(k)} + x_{nud(k)}$ and that $x_{k-1} = x_{p(k-1)} + x_{nud(k-1)}$):

$$\hat{x}_k^- = A_k \hat{x}_{k-1} + B_k u_{k-1} = \hat{x}_{k-1} - Ts \cdot rr_k \cdot \hat{x}_{k-1} + B_k u_{k-1} \quad (15)$$

and by the a priori estimate error covariance:

$$P_k^- = P_{k-1} A_k^2 + Q = P_{k-1} + Ts \cdot rr \cdot (Ts \cdot rr - 2) \cdot P_{k-1} + Q \quad (16)$$

The Kalman filter measurement update or correction equations are represented by the Kalman gain equation:

$$K_k = P_k^- H_k (P_k^- H_k^2 + R_k)^{-1} \quad (17)$$

by the a posteriori state estimate at time k given measurement $z_{tot(k)}$ $$\hat{x}_k = \hat{x}_{k-1} + [B_k u_{k-1} + K_k(z_{tot(k)} - H_k \hat{x}_k^-) - Ts \cdot rr \cdot \hat{x}_{k-1}] \quad (18)$$

(where the residual $(z_{tot(k)} - H_k \hat{x}_k^-)$ is the difference between the actual delta-P measurement and the estimate of the delta-P measurement across the DPF) and by the a posteriori estimate error covariance equation:

$$P_k = P_{k-1} + [Q - K_k H_k P_k^- + Ts \cdot rr \cdot (Ts \cdot rr - 2) \cdot P_{k-1}] \quad (19)$$

Successive a priori estimates of soot loading are made based on preceding a posteriori soot loading estimates and updated using measurement data to provide new a posteriori soot loading estimates. The a posteriori soot loading estimates can be used to trigger starting and stopping of active regeneration.

Trigger for Start of Active Regeneration

Active regeneration is triggered when the a posteriori estimated soot loading $x_k$ plus the standard deviation of the a posteriori estimated soot loading $E_k$ reaches or exceeds a pre-determined value, i.e., $x_k + E_k \geq$ trigger value.

Trigger for Stop of Active Regeneration

Active regeneration stops when the estimated soot loading is less than a pre-determined value, or the total duration of active regeneration reaches a pre-determined time limit, or the difference between the soot generation rate and the soot oxidation rate is less than a pre-determined value while the DPF temperature is above a pre-determined threshold, whichever is reached first.

Operation of the diesel engine system 21 with a control system 31 comprising a recursive filter, ordinarily a Kalman filter, proceeds so that, upon provision of an initial estimate $\hat{x}_{k-1}$ of soot loading in the DPF 25 and error covariance $P_{k-1}$ and a measurement $z_{tot(k)}$ by the sensor arrangement 29 of pressure drop across the DPF, an updated estimate $\hat{x}_k$ of soot loading in the DPF is provided. The Kalman filter will typically be part of a computer program on some computer-readable medium.

Active regeneration of the DPF 25 is triggered, i.e., the control system 31 initiates a regeneration process, in response to at least one triggering condition, the at least one triggering condition including the updated estimate $\hat{x}_k$ of soot loading.

The sensor arrangement 29 ordinarily at least periodically measures the pressure drop across the DPF 25 and includes pressure sensors proximate an inlet and an outlet of the DPF. In addition, the sensor arrangement 29 will ordinarily also measure gas temperature in the DPF. The control system 31 is ordinarily adapted to periodically update the updated estimate $\hat{x}_k$ of soot loading in view of respective ones of the at least periodic pressure drop measurements $z_{tot(k)}$ to generate a plurality of updated estimates $\hat{x}_k$ of soot loading and to periodically calculate a standard deviation $E_k$ of the plurality of updated estimates of soot loading. The control system 31 is ordinarily adapted to trigger regeneration when a sum of the updated estimate $\hat{x}_k$ of soot loading plus the standard deviation $E_k$ of the plurality of updated estimates of soot loading exceeds a predetermined value. Regeneration can be stopped when another earliest one of at least one stopping condition occurs, the updated estimate of soot loading $\hat{x}_k$ reaching another predetermined value being one of the at least one stopping condition. Another stopping condition can be a predetermined lapse of time following commencement of regeneration.

A measurement noise covariance in the Kalman filter $R_k$ can be a function of a non-uniformly distributed soot mass estimate $x_{nud(k)}$ according to the relationship previously identified in equation (14), and where the non-uniformly distributed soot mass estimate $x_{nud(k)}$ is a function of exhaust gas flow velocity $v_{(k-1)}$ in the DPF 25 and soot reaction rate $rr_{(k-1)}$ according to the relationships previously identified in equations (10), (11), and (12).

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A method for estimating soot loading in a DPF, comprising:
    measuring a pressure drop across the DPF;
    providing an estimate of soot mass loading in the DPF to a recursive filter, the estimate of soot mass loading comprising a first component determined as a function of the measured pressure drop across the DPF and assuming uniform soot mass distribution and a second, modeled non-uniform soot mass distribution component determined as a function of soot reaction rate and exhaust gas flow velocity in the DPF; and
    using the recursive filter, updating the estimate of soot mass loading in view of the measured pressure drop to provide an updated estimate of soot mass loading in the DPF;
    at least periodically measuring the pressure drop across the DPF, and at least periodically updating the updated estimate of soot mass loading in view of the at least periodic pressure drop measurements to generate a. plurality of updated estimates of soot mass loading and calculating a standard deviation of the plurality of updated estimates of soot mass loading; and
    triggering regeneration when the updated estimate of soot mass loading plus the standard deviation, or a function of the estimated error, of the plurality of updated estimates of soot mass loading exceeds a predetermined value.

2. The method for estimating soot loading in a DPF as set forth in claim 1, wherein the modeled non-uniform soot mass distribution is a function of exhaust gas flow velocity in the DPF and soot reaction rate.

3. The method for estimating soot loading in a DPF as set forth in claim 1, wherein the recursive filter is a Kalman filter.

4. The method for estimating soot loading in a DPF as set forth in claim 3, wherein a measurement noise covariance in the Kalman filter is a function of the modeled non-uniform soot mass distribution.

5. The method for estimating soot loading in a DPF as set forth in claim 1, comprising, after triggering regeneration of the DPF, stopping regeneration of the DPF when another earliest one of at least one stopping condition occurs, the updated estimate of soot mass loading reaching another predetermined value being one of the at least one stopping condition.

6. The method for estimating soot loading in a DPF as set forth in claim 5, wherein another one of the at least one stopping condition comprises lapsing of a predetermined period of time.

7. A non-transitory computer-readable medium including a computer program for performing the method of claim 1.

8. A diesel engine system, comprising:
    a diesel engine;
    a DPF downstream of the engine;
    a pressure sensor arrangement for measuring pressure drop across the DPF; and
    a control system comprising a recursive filter arranged so that, upon provision of an estimate of soot mass loading in the DPF and a measurement b the pressure sensor arrangement of pressure drop across the DPF, an updated estimate of soot mass loading in the DPF is provided, and so that active regeneration of the DPF is triggered in response to at least one triggering condition, the at least one triggering condition including the updated estimate of soot mass loading, the estimate of soot mass loading comprising a first component determined as a function of the measured pressure drop across the DPF and assuming uniform soot mass distribution and a second, modeled non-uniform soot mass distribution component determined as a function of soot reaction rate and exhaust gas flow velocity in the DPF,
    wherein the pressure sensor arrangement at least periodically measures the pressure drop across the DPF, and the control system is adapted to periodically update the updated estimate of soot mass loading in view of respective ones of the at least periodic pressure drop measurements to generate a plurality of updated estimates of soot mass loading and to periodically calculate a standard deviation of the plurality of updated estimates of soot mass loading, the control system being adapted to trigger regeneration when the updated estimate of soot mass loading plus the standard deviation, or a function of the estimated error, of the plurality of updated estimates of soot mass loading exceeds a predetermined value.

9. The diesel engine system as set forth in claim 8, wherein the recursive filter is a Kalman filter.

10. The diesel engine system as set forth in claim 9, wherein a measurement noise covariance in the Kalman filter is a function of the modeled non-uniform soot mass distribution.

* * * * *